(12) United States Patent
Keller et al.

(10) Patent No.: US 8,375,725 B2
(45) Date of Patent: Feb. 19, 2013

(54) INTEGRATED PRESSURIZED STEAM HYDROCARBON REFORMER AND COMBINED CYCLE PROCESS

(75) Inventors: Arnold P. Keller, Houston, TX (US); Subbaraman Viswanathan, Houston, TX (US)

(73) Assignee: Phillips 66 Company, Houston, TX (US)

( * ) Notice: Subject to any disclaimer, the term of this patent is extended or adjusted under 35 U.S.C. 154(b) by 955 days.

(21) Appl. No.: 12/048,805

(22) Filed: Mar. 14, 2008

(65) Prior Publication Data

US 2009/0229239 A1 Sep. 17, 2009

(51) Int. Cl.
*C01B 3/26* (2006.01)
*F02C 6/00* (2006.01)

(52) U.S. Cl. ........ 60/780; 60/783; 60/39.182; 60/39.12; 48/127.9; 48/95; 48/96

(58) Field of Classification Search ............... 60/39.182, 60/783, 39.15, 780, 781, 39.12; 48/127.9, 48/95, 96
See application file for complete search history.

(56) References Cited

U.S. PATENT DOCUMENTS

| | | | |
|---|---|---|---|
| 4,150,953 A * | 4/1979 | Woodmansee | 48/71 |
| 4,725,380 A | 2/1988 | Pinto | |
| 5,181,937 A | 1/1993 | Karafian et al. | |
| 5,300,275 A | 4/1994 | Lywood | |
| 6,114,400 A * | 9/2000 | Nataraj et al. | 518/715 |
| 6,196,000 B1 * | 3/2001 | Fassbender | 60/649 |
| 6,200,128 B1 | 3/2001 | Kobayashi | |
| 6,265,453 B1 | 7/2001 | Kennedy | |
| 6,277,894 B1 | 8/2001 | Agee et al. | |
| 6,505,467 B1 * | 1/2003 | Fjellhaug et al. | 60/780 |
| 6,525,104 B2 | 2/2003 | Abbott | |
| 7,634,915 B2 * | 12/2009 | Hoffmann et al. | 60/780 |
| 2003/0110694 A1 | 6/2003 | Drnevich et al. | |

FOREIGN PATENT DOCUMENTS

| | | |
|---|---|---|
| GB | 2179366 | 3/1987 |
| WO | WO 03/062142 | 7/2003 |

OTHER PUBLICATIONS

E. H. Stitt, B. J. Crewdon, Emerging Trends in Syngas and Hydrogen. CatCon 2000, Jun. 12-13, 2000.
P. E. J. Abbott, B. J. Crewdson, Fischer-Tropsch Production Developments Using Gas Heated Reforming Technology. Feb. 21, 2002.
P. W. Farnell, Synetix's Advanced Gas heated Reformer. © Johnson Matthey Group, 668W/119/0/REF.
P.E.J. Abbott, Get More Production from Your Hydrogen Plant. © Johnson Matthey Group, 668W/119/0/REF.
J. Ramachandran and M.C. Conway, An Advanced Technology 70 MW Class 50/60 Hz Gas Turbine. GER-3765B.
D. Popov, Combined High Temperature Heat and Power Generation Using an Advanced Gas Turbine: Application to a Hydrogen Plant. Technical University of Sofia.

(Continued)

*Primary Examiner* — William H Rodriguez
*Assistant Examiner* — Steven Sutherland
(74) *Attorney, Agent, or Firm* — Phillips 66 Company

(57) ABSTRACT

A process for the co-production of hydrogen and power through the integration of a hydrogen production unit and a power generation unit is provided. The hydrogen production unit comprises a gas heated reformer, a water gas shift reactor, and a hydrogen separator which produces a low-BTU hydrocarbon fuel stream and a purified hydrogen stream. The low-BTU hydrocarbon fuel stream, along with a compressed oxygen-containing stream extracted from the power generation unit, is combusted to provide heat to the reformer.

34 Claims, 3 Drawing Sheets

OTHER PUBLICATIONS

Hanne M. Kvamsdal, Energy Analysis of Gas-Turbine Combined Cycle with CO2 Capture Using Pre-combustion Decarbonization of Natural Gas. GT-2002-30411.

Early Entrance Co-production Plant: Phase I Preliminary Concept Report. DOE Cooperative Agreement No. DE-FC26-99-FT40658 May 17, 2001.

* cited by examiner

INTEGRATED PRESSURIZED STEAM HYDROCARBON REFORMER AND COMBINED CYCLE PROCESS

BACKGROUND OF THE INVENTION

1. Field of the Invention

A process and system for the co-production of hydrogen, power and, optionally, steam from a hydrocarbon fuel source is provided. Particularly, these products are generated through the integration of certain operations of a hydrogen production unit and a power generation unit.

2. Description of the Prior Art

Refineries, chemical plants, and the like generally require hydrogen, power, and steam in order to operate. One common approach to supply these requisite materials is to use a steam methane reformer (SMR) for hydrogen production and a combined cycle process (CCP) for power production. Both units are capable of being modified to produce steam, if required. The SMR and CCP are generally operated independently.

Along with hydrogen, a relatively low-energy content gas stream is also produced by the steam methane reforming process. Such low-energy content streams are generally used to back out natural gas from the furnace. Further, the reactants within the SMR are generally under high-pressure. Therefore, the reformer reactor tube walls must be of a thick construction to withstand the high-pressure reactants contained therein. The thick tube wall design leads to large capital expense and reduced heat transfer efficiency. Also, maintenance expenses are higher as these thick-wall tubes require replacement after operational failures.

SUMMARY OF THE INVENTION

In one embodiment of the present invention there is provided a process for the co-production of hydrogen and power. Generally, the process comprises supplying a feed stream to a hydrogen production unit comprising a gas heated reformer, a water gas shift reactor, and a hydrogen separator. The feed stream comprises a first portion of a high-BTU hydrocarbon fuel and steam. A hydrogen-containing stream and a low-BTU fuel stream are produced in the hydrogen production unit, with the low-BTU fuel having an average BTU content per SCF that is lower than that of the high-BTU fuel. A second portion of said high-BTU hydrocarbon fuel and an oxygen-containing gas are supplied to a power generation unit comprising a combustion gas turbine engine. The second portion of high-BTU hydrocarbon fuel is combusted within the combustion gas turbine engine to generate power. A portion of compressed oxygen-containing gas (usually air) is extracted from the combustion gas turbine engine, is passed through a compressor to increase the pressure thereof, and directed to a pressurized partial combustion unit contained within the hydrogen production unit. The low-BTU fuel and, optionally, a third portion of the high-BTU hydrocarbon fuel, are combusted in the pressurized partial combustion unit to produce a high-pressure partial combustion gas stream. The high-pressure combustion gas stream is then used as a heat source for the gas heated reformer.

In another embodiment of the present invention there is provided a process for the co-production of hydrogen and power. Generally, the process comprises supplying a feed stream to a hydrogen production unit comprising a gas heated reformer, a water gas shift reactor, and a hydrogen separator. The feed stream comprises a first portion of a high-BTU hydrocarbon fuel and steam. A hydrogen-containing stream and a low-BTU fuel stream are produced in the hydrogen production unit, with the low-BTU fuel having an average BTU content per SCF that is lower than that of the high-BTU fuel. A second portion of the high-BTU hydrocarbon fuel and an oxygen-containing gas are supplied to a power generation unit comprising a gas turbine engine. The second portion of high-BTU hydrocarbon fuel is combusted within the gas turbine engine to generate power. A portion of compressed oxygen-containing gas is extracted from gas turbine engine and is cooled thereby forming a cooled stream of oxygen-containing gas. The cooled stream of oxygen containing gas is compressed thereby forming a high-pressure, oxygen-containing gas stream. The high-pressure, oxygen-containing gas stream is directed to a pressurized partial combustion unit contained within the hydrogen production unit. The low-BTU fuel and, optionally, a third portion of said high-BTU hydrocarbon fuel, are combusted in the pressurized partial combustion unit to produce a hot high-pressure combustion gas stream. The high-pressure combustion gas stream is used as a heat source for said gas heated reformer.

In yet another embodiment of the present invention there is provided a system for the co-production of hydrogen and power. The system generally comprises a hydrogen production unit and a power generation unit. The hydrogen production unit comprises a gas heated reformer including a reforming catalyst through which a stream comprising a high-BTU hydrocarbon fuel and steam is passed, a pressurized partial combustion unit that supplies a hot high-pressure combustion gas stream to the gas heated reformer, a water gas shift reactor, and a hydrogen separator that produces a low-BTU fuel stream and a hydrogen containing stream. The power generation unit comprises a combustion gas turbine engine for generating power, a compressed oxygen-containing gas stream that is extracted from the combustion gas turbine, and a compressor for further compressing the compressed oxygen-containing gas extracted from the combustion gas turbine engine. The low-BTU fuel stream and the oxygen-containing gas stream are fluidly coupled with the pressurized partial combustion unit.

DETAILED DESCRIPTION OF THE PREFERRED EMBODIMENT

As used herein, the term "high-BTU hydrocarbon fuel" refers to a hydrocarbon fuel presenting an average energy content of at least 150 BTU/SCF, and in certain embodiments, at least 1000 BTU/SCF. Exemplary high-BTU hydrocarbon fuels that may be used as described herein include natural gas (primarily methane), liquefied petroleum gas (LPG), propane, butane, pentane, and diesel oil.

As used herein, the term "low-BTU hydrocarbon fuel" refers to a hydrocarbon fuel presenting an average energy content that is less than that of the high-BTU hydrocarbon fuel used in the described process. In particular embodiments, the low-BTU hydrocarbon fuel presents an average energy content that is less than half of the average energy content of the high-BTU hydrocarbon fuel. In certain embodiments according to the present invention, the low-BTU hydrocarbon fuel comprises the same hydrocarbon present in the high-BTU hydrocarbon fuel, only in a reduced concentration primarily due to the presence of additional low energy content components in the fuel, such as carbon monoxide and diluents such as carbon dioxide. In exemplary embodiments, the low-BTU hydrocarbon fuel presents an energy content of less than 150 BTU/SCF, less than 100 BTU/SCF, or less than 50 BTU/SCF.

As used herein, the term "oxygen-containing stream" refers to a stream that comprises a source of free or elemental oxygen. The oxygen-containing stream may comprise oxygen as the predominant component or as a secondary component. In certain embodiments, the oxygen-containing stream comprises air, however, it is possible (although unlikely from an economic view point and because of technical limitations set by the gas turbine manufacturer) for the oxygen-containing stream to comprise substantially pure oxygen.

As used herein, the term "power" refers to either mechanical power or electrical power. Useful mechanical power produced in certain embodiments of the present invention may be manifested through the rotation of a drive shaft which can be used directly in the operation of pumps, compressors, generators, or the like. Electrical power, i.e., the work done by an electric current, is produced by an electrical generator as a result of the conversion of mechanical power.

Figure 1:
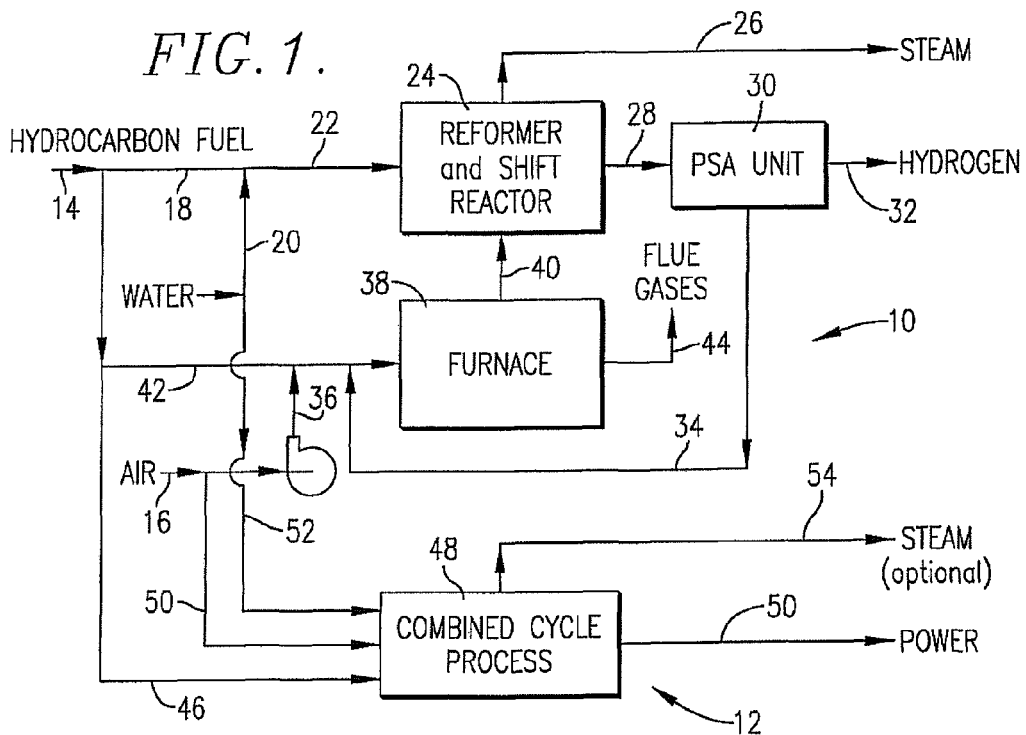
FIG. 1 is a schematic diagram of a system for the production of hydrogen and power utilizing separate, non-integrated hydrogen production and power generation units.

Turning initially to FIG. 1, a system for the production of hydrogen, power and steam is depicted. The system comprises a hydrogen production unit 10 and a power generation unit 12. A gaseous, high-BTU hydrocarbon fuel stream 14 is provided to the process along with an oxygen-containing stream 16, shown as an air source, although, any source of elemental oxygen can be used. A first portion of the hydrocarbon fuel stream 18 is directed toward hydrogen production unit 10. A source of water 20 is mixed with hydrocarbon fuel stream 18 to form a hydrocarbon fuel/steam mixture stream 22. Stream 22 serves as the feed to a steam reformer followed by a water gas shift reactor, collectively identified as unit 24. The reaction products of unit 24 are generally at an elevated temperature and can be used to generate steam 26, while the cooled products themselves 28 are delivered to a pressure swing absorber unit 30 where they are separated into a predominantly hydrogen stream 32 and a low-BTU fuel stream 34.

The energy source present within low-BTU fuel stream 34 derives mainly from unconsumed hydrocarbon fuel initially input to unit 24 and unconverted CO from the reformer of unit 24. Low-BTU fuel stream 34 along with a supply of air 36 is combusted and used to generate heat in a furnace 38 which is then supplied to the reformer of unit 24. It is noted that low-BTU fuel stream 34 is generally not capable of supplying all of the heat 40 required by the reformer of unit 24 when combusted in a conventional furnace. Thus, additional quantities of the high-BTU hydrocarbon fuel is supplied to furnace 38 via stream 42. The flue gases 44 from furnace 38 are cooled to make steam and may also be used to preheat furnace air, then are vented or disposed of in an appropriate manner.

Simultaneously, a second portion of the high-BTU hydrocarbon fuel is supplied to power generation unit 12 via stream 46. Particularly, stream 46 is supplied to a combined cycle process 48 where it is combusted with a second portion of air delivered via stream 50 to produce power 52 in the form of mechanical work which in turn can be converted into electricity. It is noted that the combined cycle processes of the embodiments described herein generally comprise a combustion gas turbine engine and a heat recovery steam generator. Although, it is within the scope of the present invention for the combined cycle process to be substituted with only a combustion gas turbine engine for those applications in which the generation of steam is not desired. A stream of water 53 is also supplied to the combined cycle process 48 which utilizes the heat present in the exhaust gases generated by the gas turbine engine to produce additional quantities of steam 54 and/or additional power made in a stream turbine (not shown) leaving in power stream 52.

Other than the input streams of hydrocarbon fuel, air, and water, none of the process streams are shared between hydrogen production unit 10 and power generation unit 12. Thus, the units are not integrated and essentially operate independently from each other.

Figure 2:
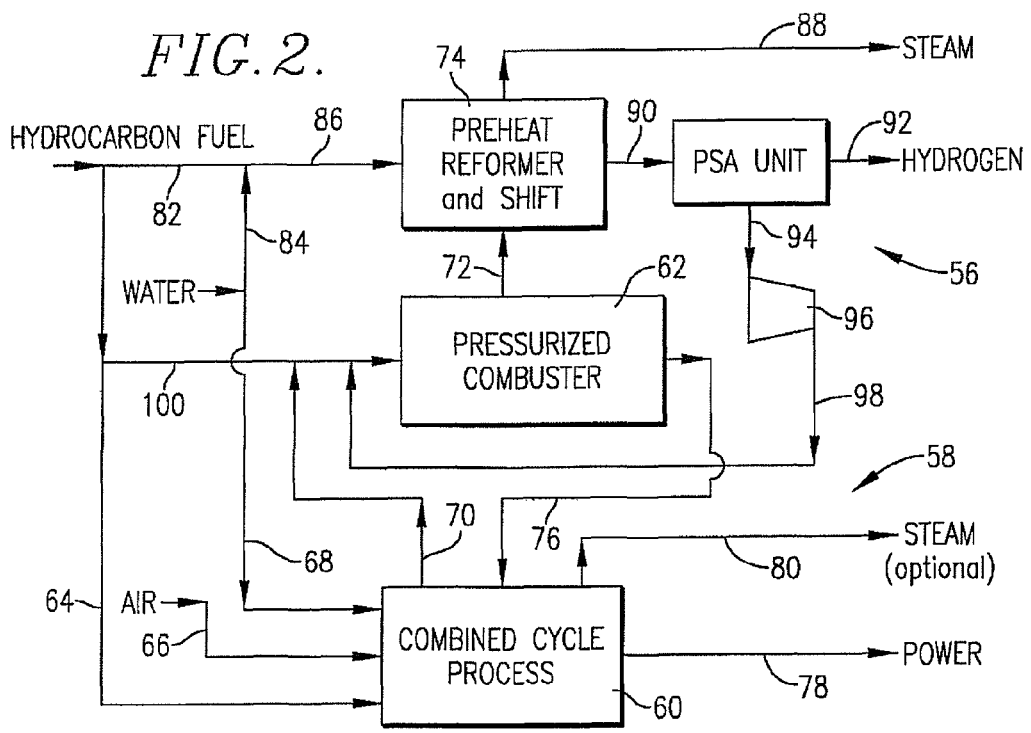
FIG. 2 is a schematic diagram of a system for the production of hydrogen and power utilizing integrated hydrogen production and power generation units.

FIG. 2 illustrates a modification of the system shown in FIG. 1 according to one embodiment of the present invention. In this system, a hydrogen production unit 56 is integrated with a power generation unit 58. Particularly, the integration occurs between a combined cycle process 60 of the power generation unit and a pressurized partial combustion unit 62 located within the hydrogen production unit.

Power generation unit 58 operates in a substantially similar manner to unit 12 shown in FIG. 1. A hydrocarbon fuel stream 64, an air stream 66, and a water stream 68 are supplied to combined cycle process 60. However, a portion of compressed air 70 is extracted from the gas turbine within the CCP and is directed toward pressurized combustion unit 62. Gas turbines, such as the standard GE 6FA model gas turbine, have the capability to extract up to 16% of the compressed air generated. However, certain embodiments of the present invention only extract up to about 8% of the compressed air generated by the gas turbine. As explained in greater detail below, pressurized combustion unit 62 produces a hot high-pressure combustion gas stream 72 that is used to supply heat to the reformer reactor within unit 74. Following its use in the hydrogen production unit (where it is cooled), this stream is returned to the combined cycle process 60 via stream 76. As in the process depicted in FIG. 1, combined cycle gas process 60 produces power 78, and optionally, steam 80.

Hydrogen production unit 56 also operates in a manner similar to hydrogen production unit 10 of FIG. 1. A hydrocarbon fuel stream 82 is mixed with steam made from water stream 84 and is fed to the steam reformer and shift reactors within unit 74 via stream 86. Some of the waste heat from steam reformer and shift reactor unit 74 is used to generate steam 88. The products 90 of unit 74 are delivered to a pressure swing absorber unit 91 where they are separated into a predominantly pure hydrogen stream 92 and a low-BTU fuel stream 94. Low-BTU fuel stream 94 is directed through at least one compression stage 96 to produce a high-pressure, low-BTU fuel stream 98. Stream 98 and pressurized air stream 70 (and further amounts of hydrocarbon fuel via stream 100 as necessary) are combined together and combusted in the pressurized combustion unit 62 in which the low-BTU fuel is combusted.

The use of pressurized air 70 extracted from combined cycle process 60 allows for more efficient utilization of combustion heat as compared to a conventional furnace, thus requiring less additional hydrocarbon fuel 100 to be used within combustion unit 62. Also, using high-pressure combustion gas stream 72 to supply heat to the steam reformer and shift reactor of unit 74 allows a less expensive, more efficient, and more compact reformer to be used.

Figure 3:
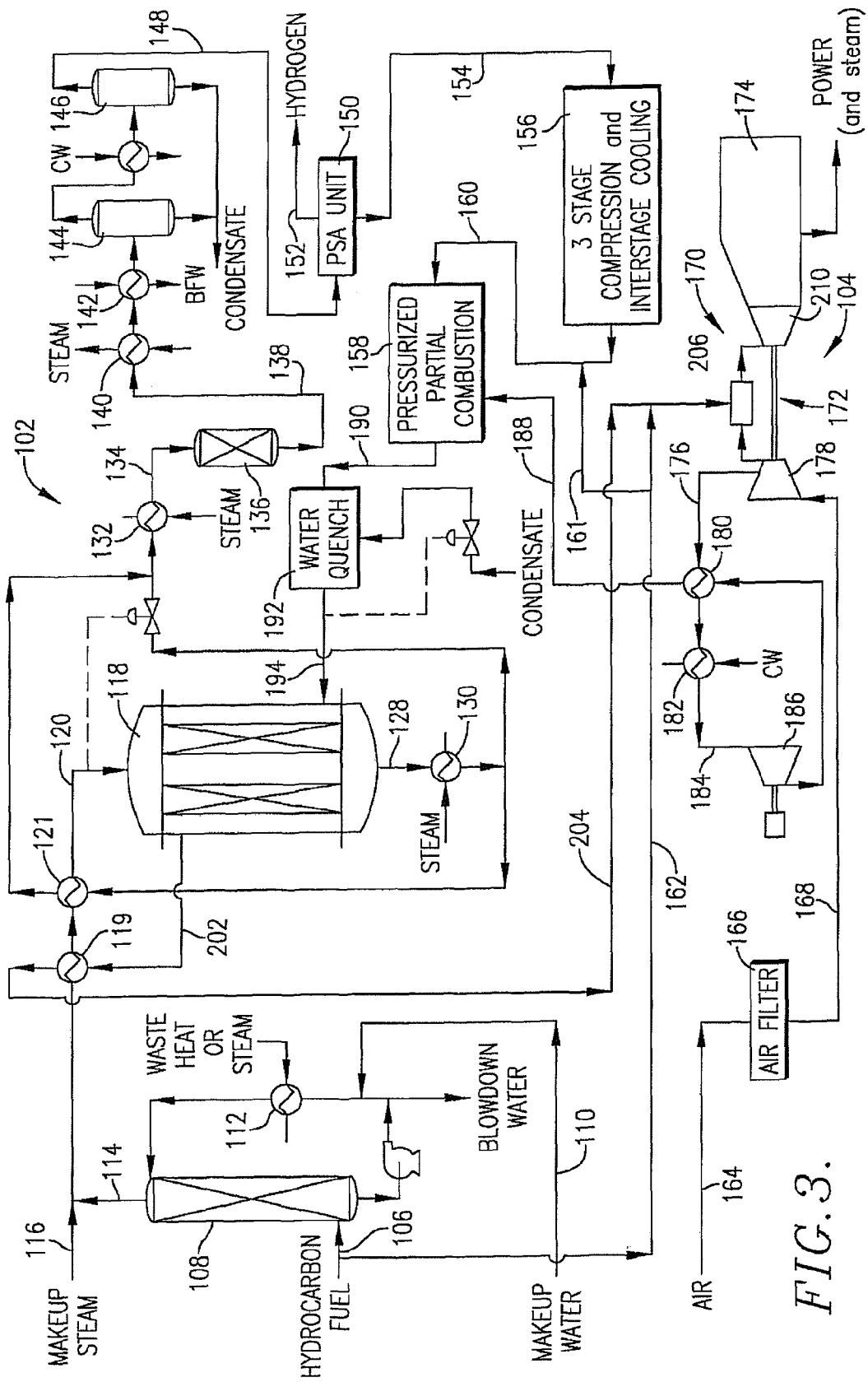
FIG. 3 is a detailed schematic diagram of a process in accordance with FIG. 2.

FIG. 3 is a detailed view of an embodiment of the process shown in FIG. 2. This embodiment of the invention comprises a hydrogen production unit 102 and a power generation unit 104. A first portion 106 of the hydrocarbon fuel feed, desulfurized natural gas in this particular embodiment (although, the system may be modified to utilize other hydrocarbon fuels), is supplied to hydrogen production unit 102 and first passes through a saturator 108. Water is supplied to saturator 108 through a makeup water stream 110. Stream 110 may be heated or evaporated by heat exchanger 112 prior to being delivered to saturator 108. A saturated hydrocarbon fuel stream 114 is combined with additional quantities of makeup steam 116 to provide a fine control on the steam to carbon feed ratio and is delivered to a non-conventional steam reformer 118 via combined stream 120. The combined stream 120 presents a nominal ratio of steam to carbon of 2.8 and is preheated to about 900° F. in a series of heat exchangers 119 and 121 using heat recovered from downstream process gas. Stream 120 also presents a pressure of about 400 psia prior to entering reformer 118.

Figure 4:
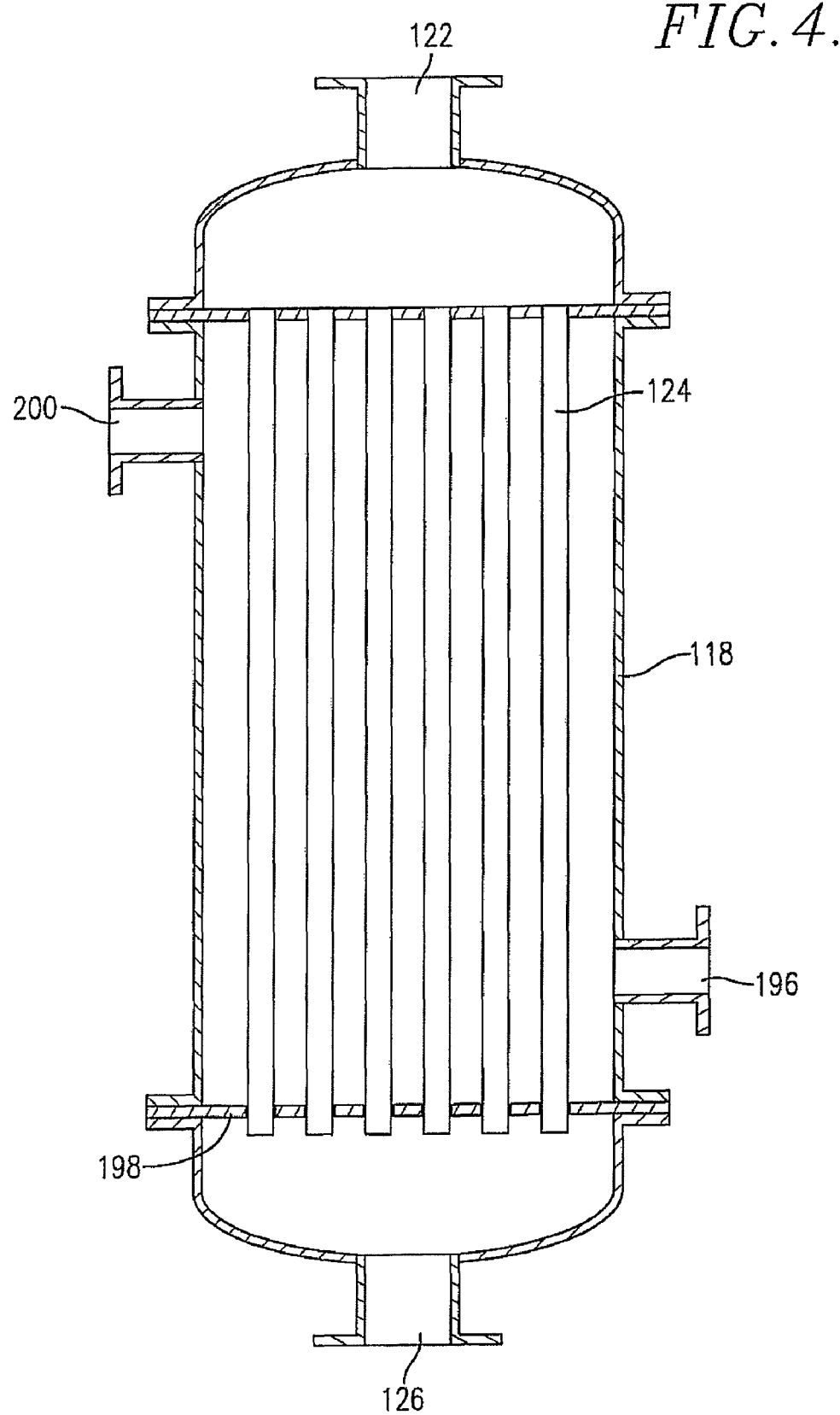
FIG. 4 is a schematic diagram of an exemplary gas heated reformer that can be used in the process shown in FIG. 3.

An exemplary steam reformer for use with the present embodiment of the invention is a tube and shell reactor 118 depicted in FIG. 4. The hydrocarbon fuel and steam stream enters reactor 118 through inlet 122 where it is distributed between a plurality of catalyst-filled tubes 124. Any reforming catalyst of appropriate size and shape known to those of skill in the art may be used. Within tubes 124, the hydrocarbon and steam mixture is reformed thereby providing hydrogen and carbon monoxide as the primary reaction products. The reaction products exit reactor 118 through outlet 126 at a temperature that is typically between about 1560° F. to about 1580° F. (although this temperature may widely vary.

The exit gas 128 from the reformer tubes is cooled in a series of heat exchangers 130, 121, and 132. As shown, heat exchanges 130 and 132 may be used to produce superheated steam. Alternatively, these two exchangers can be used to raise stream from boiler feed wastes and superheated elsewhere (if necessary). These combinations of alternative heat recovery options are well known to those of skill in the art. The cooled gas 134, now at a temperature of about 625° F., is fed to a high temperature carbon monoxide shift reactor 136 where at least a portion of the co-produced carbon monoxide is reacted with steam to produce further quantities of hydrogen and carbon dioxide. The product stream 138 of shift reactor 136 undergoes a series of cooling steps 140, 142 and water knockout steps 144, 146. In the embodiment depicted, steam is produced in heat exchanger 140 and boiler feed water is preheated in heat exchanger 142. The cooled synthesis gas 148 is delivered to a pressure swing absorber (PSA) unit 150 in which the hydrogen is separated from the other stream components to produce a purified hydrogen stream 152 and a low-BTU fuel stream 154. In certain embodiments, hydrogen stream 152 presents a purity of about 99.99% hydrogen. Low-BTU fuel stream 154 undergoes a three-stage compression process with intercooling 156 which raises the pressure of the BTU fuel stream to about 400 psia. The compressed low-BTU fuel is then delivered to a pressurized partial combustion unit 158 via stream 160.

Concurrent with the operation of hydrogen production unit 102, power generation unit 104 utilizes a second portion 162 of the hydrocarbon fuel feed and air supplied via stream 164 to produce power and, optionally, steam. Air stream 164 is passed through a filter 166 in order to remove particulate matter or other contaminants. Filtered stream 168 is then supplied to a combined cycle process 170 which generally comprises a combustion gas turbine engine 172 and a heat recovery steam generator 174, and optionally a steam turbine operating in a Rankine cycle making use of the steam raised in the heat recovery steam generator 174. Upon entering engine 172, stream 168 is initially compressed. A portion of the compressed air generated by compressor 178 is extracted to stream 176 at a pressure of about 231 psia and a temperature of 872° F. The extracted air needs to be elevated in pressure to about the same pressure level as low-BTU fuel stream 160 prior to its delivery to pressurized partial combustion unit 158. A booster compressor 186 is employed to accomplish this task. However, the temperature of air stream 176 must be lowered so as to avoid damaging booster compressor 186. Thus, air stream 176 undergoes a series of upstream cooling steps in heat exchangers 180, 182. The cooled extracted air 184 is then compressed to a pressure of about 405 psia and delivered to pressurized partial combustion unit 158 via stream 188.

The low-BTU fuel feed 160, which may contain some additional high-BTU hydrocarbon fuel supplied via stream 161, is combusted within pressurized partial combustion unit 158 to produce a high-pressure combustion product stream 190 which will be used to supply heat to the shell side of reformer 118. Generally, the maximum inlet temperature to the reformer shell side is approximately 1850° F. Therefore, in order to prevent possible damage to the reactor, and particularly to the reactor fins, a water quench unit 192 is provided to control the temperature of high-pressure combustion gas stream 194 entering the shell side of reactor 118 through inlet 196.

The pressure of the combustion gas entering the reformer shell side is precisely controlled so as to balance the pressure within reformer tubes 124 at the "hot" end. A balance between the pressures within the tubes and on the shell side is required as there is no seal between tubes 124 and tube sheet 198 at the "hot" end since the tubes must remain free to expand downwards within the tube sheet. In certain embodiments, the pressure of the reactant gas within tubes 124 is greater than the pressure within the shell side so as to prevent the high-pressure combustion gas from entering tubes 124. In other embodiments, the pressure of the reactants in tubes 124 is within about 10 inches of water gauge of the pressure of high-pressure combustion gas stream 194. In still other embodiments, leakage flow between tubes 124 and tube sheet 198 is controlled by balancing the pressure differential between the tube and shell sides of reformer 118 to about +/−2 to 3 inches of water gauge.

As noted above, the balancing of the pressure within tubes 124 and the reactor shell allows tubes 124 to present thinner wall thicknesses which results in enhanced heat transfer performance and lower capital costs. As the heat to reformer 118 is supplied by a combustion gas stream 194, heat is transferred to the reactants within tubes 124 via convection and not radiantly thereby resulting in a more compact reformer design compared to a conventional steam methane reformer. This is particularly useful in congested facilities, such as refineries and chemical production units. Further, as the shell and tubes are not completely sealed from each other, it is noted that combustion products 194 entering reformer 118 generally do not comprise oxygen or soot (or merely negligible amounts thereof). This is achieved by providing in pressurized partial combustion unit 158 from between about 95 to about 97% of the stoichiometric oxygen requirement.

The high-pressure combustion gas exits reformer 118 through outlet 200 via stream 202 and is used to supply heat to heat exchanger 119. Combustion gas stream 204 may still contain some useable fuel (less than about 10 BTU/SCF or less than about 5 BTU/SCF in certain embodiments). However, this stream contains both pressure and thermal energy which will be partially recovered as it is expanded across the expansion turbine 210 within the combustion gas turbine engine 172 along with additional high-BTU hydrocarbon fuel supplied from stream 162 and delivered to a combuster 206 of the combustion gas turbine engine 172. Conventional gas turbine engines today are capable of being designated to operate using fuel having an average energy content sometimes as low as 180 BTU/SCF.

The exhaust gas stream from engine 172 is cooled in the heat recovery steam generator 174 and is used to generate steam that can be utilized in other processes within the plant or to generate additional power in a steam turbine (not shown).

The process of FIG. 3, described above, was simulated with HYSYS simulation software and compared to a process design in which the hydrogen production and power generation units are not integrated, such as according to the process shown in FIG. 1. Table 1 provides the simulated hydrogen, steam, and power outputs for each system. The simulation demonstrates that while the integrated process uses approximately 11% more natural gas, it generates approximately 14.5% more power than the non-integrated process.

TABLE 1

|  | Integrated Process | Non-Integrated Process |
|---|---|---|
| Natural Gas Consumed (lbmole/hr) | | |
| To Saturator (lbmole/hr) | 818.0 | 818.0 |
| To Gas Turbine (lbmole/hr) | 2420.0 | 2154.2 |
| To Reformer Combustion Gas (lbmole/hr) | 150.6 | 78.7 |
| Overall NG Consumed (lbmole/hr) | 3388.6 | 3050.9 |
| Overall NG Consumed (MMBTU/hr) | 1,188 | 1,070 |
| Steam Consumed | | |
| After Saturator (MMBTU/hr) | 4.363 | 4.363 |
| Saturator Steam Heater (MMBTU/hr) | 43.66 | 43.66 |
| Total Steam Consumed (MMBTU/hr) | 48.023 | 48.023 |
| Power Consumed | | |
| Saturator Circ Pump (MW) | 0.0077 | 0.0077 |
| Fuel Compressor (3 stages) (MW) | 1.8577 | 0 |
| Extraction Air Booster Compr (MW) | 1.6979 | 0 |
| Air Blower | 0 | 0.137 |
| ID Fan | 0 | 0.074 |
| Total Power Consumed (MW) | 3.5633 | 0.2187 |
| Gross Hydrogen Production (MMSCFD) | 18.812 | 18.812 |
| Gross Steam Production | | |
| Out of Pressurized Reformer (MMBTU/hr) | 20.29 | 0 |
| Out of SMR (MMBTU/hr) | 0 | 36.58 |
| Prior to CO Shift (New Process) (MMBTU/hr) | 12.87 | 0 |
| Downstream from CO Shift (MMBTU/hr) | 26.28 | 26.28 |
| Total Steam Production (MMBTU/hr) | 59.44 | 62.86 |
| Gross Power Production (MW) | 138.50 | 118.1 |
| Net Hydrogen (MMSCFD) | 18.812 | 18.812 |
| Net Steam (MMBTU/hr) | 11.417 | 14.837 |
| Net Power (MW) | 134.94 | 117.88 |
| Relative NG Feed Rate | 1.111 | 1.000 |
| Relative Power Production | 1.145 | 1.000 |

The embodiments of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A process for the co-production of hydrogen and power comprising:
   supplying a feed stream to a hydrogen production unit comprising a gas heated reformer, a water gas shift reactor, and a hydrogen separator, said feed stream comprising a first portion of a high-BTU hydrocarbon fuel and steam;
   producing a hydrogen-containing stream and a low-BTU hydrocarbon fuel stream in said hydrogen production unit, said low-BTU hydrocarbon fuel having an average BTU content per SCF that is lower than that of said high-BTU hydrocarbon fuel;
   supplying a second portion of said high-BTU hydrocarbon fuel and an oxygen-containing gas to a power generation unit comprising a combustion gas turbine engine and combusting said second portion of high-BTU hydrocarbon fuel within said engine to generate power;
   extracting a portion of compressed oxygen-containing gas from said combustion gas turbine engine, passing said portion of compressed oxygen-containing gas through a compressor to increase the pressure thereof, and directing said portion of compressed oxygen-containing gas from said compressor to a pressurized partial combustion unit contained within said hydrogen production unit;
   combusting said low-BTU hydrocarbon fuel and, a third portion of said high-BTU hydrocarbon fuel, in said pressurized partial combustion unit to produce a high-pressure partial combustion gas stream; and
   using said high-pressure combustion gas stream as a heat source for said gas heated reformer.

2. The process according to claim 1, wherein said high-BTU hydrocarbon fuel is selected from the group consisting of natural gas, propane, LPG, butane, pentane, diesel oil, and combinations thereof.

3. The process according to claim 1, wherein said high-BTU hydrocarbon fuel presents an average energy content of at least 150 BTU/SCF.

4. The process according to claim 1, wherein the pressure of said hydrogen production unit feed stream within said gas heated reformer is greater than the pressure of said high-pressure partial combustion gas stream within said gas heated reformer.

5. The process according to claim 1, wherein said low-BTU hydrocarbon fuel presents an average energy content that is less than half of the average energy content of said high-BTU hydrocarbon fuel.

6. The process according to claim 1, wherein said power generation unit comprises a combined cycle process including said combustion gas turbine engine and a heat recovery steam generator, and a steam turbine operating in a Rankine cycle using at least a portion of the steam generated in the heat recovery steam generator.

7. The process according to claim 6, wherein the exhaust gas from said combustion gas turbine engine is used to supply heat to said heat recovery steam generator for the production of steam.

8. The process according to claim 7, wherein at least some of said steam produced by said heat recovery steam generator is used to generate power in said steam turbine operating in a Rankine cycle.

9. The process according to claim 1, wherein said compressed oxygen-containing gas extracted from said combustion gas turbine engine is cooled by one or more heat exchangers prior to being passed through said compressor.

10. The process according to claim 1, wherein said gas heated reformer comprises a tube and shell reactor, said tubes containing a reforming catalyst through which said hydrogen production unit feed stream is passed, and wherein said high-pressure partial combustion gas stream from said pressurized partial combustion unit is delivered to the shell-side of said reactor.

11. The process according to claim 10, wherein the pressure of said hydrogen production unit feed stream is within about 10 inches of water gauge of the pressure of said high-pressure partial combustion gas stream.

12. The process according to claim 1, wherein at least a portion of said high-pressure combustion gas stream is returned to at least one combustor within said combustion gas turbine engine following passage through said gas heated reformer.

13. The process according to claim 1, wherein said gas heated reformer produces a reformer product stream comprising a quantity of hydrogen and carbon monoxide, said reformer product stream being fed to said water gas shift reactor for the production of carbon dioxide and additional quantities of hydrogen.

14. The process according to claim 13, wherein said shift reactor produces a shift reactor product stream which is fed to said hydrogen separator thereby producing said hydrogen-containing stream and said low-BTU hydrocarbon fuel stream.

15. The process according to claim 14, wherein said hydrogen separator comprises a pressure swing adsorber.

16. A process for the co-production of hydrogen and power comprising:
supplying a feed stream to a hydrogen production unit comprising a gas heated reformer, a water gas shift reactor, and a hydrogen separator, said feed stream comprising a first portion of a high-BTU hydrocarbon fuel and steam;
producing a hydrogen-containing stream and a low-BTU hydrocarbon fuel stream in said hydrogen production unit, said low-BTU hydrocarbon fuel having an average BTU content per SCF that is lower than that of said high-BTU hydrocarbon fuel;
supplying a second portion of said high-BTU hydrocarbon fuel and an oxygen-containing gas to a power generation unit comprising a gas turbine engine and combusting said second portion of high-BTU hydrocarbon fuel within said gas turbine engine to generate power;
extracting a portion of compressed oxygen-containing gas from said gas turbine engine; cooling said extracted portion of compressed oxygen-containing gas thereby forming a cooled stream of oxygen-containing gas;
compressing said cooled stream of oxygen containing gas thereby forming a high-pressure, oxygen-containing gas stream; directing said high-pressure, oxygen-containing gas stream to a pressurized partial combustion unit contained within said hydrogen production unit;
combusting said low-BTU hydrocarbon fuel and, a third portion of said high-BTU hydrocarbon fuel, in said pressurized partial combustion unit to produce a high-pressure partial combustion gas stream; and
using said high-pressure combustion gas stream as a heat source for said gas heated reformer.

17. The process according to claim 16, wherein said high-BTU hydrocarbon fuel is selected from the group consisting of natural gas, propane, LPG, butane, pentane, diesel oil, and combinations thereof.

18. The process according to claim 16, wherein said high-BTU hydrocarbon fuel presents an average energy content of at least 150 BTU/SCF.

19. The process according to claim 16, wherein the pressure of said hydrogen production unit feed stream within said gas heated reformer is greater than the pressure of said high-pressure partial combustion gas stream within said gas heated reformer.

20. The process according to claim 16, wherein said low-BTU hydrocarbon fuel presents an average energy content that is less than half of the average energy content of said high-BTU hydrocarbon fuel.

21. The process according to claim 16, wherein said power generation unit comprises a combined cycle process that includes said gas turbine engine and a heat recovery steam generator.

22. The process according to claim 21, wherein the exhaust gas from said gas turbine engine is used to supply heat to said heat recovery steam generator for the production of steam.

23. The process according to claim 21, wherein at least a portion of said high-pressure partial combustion gas stream is returned to said combined cycle process following passage through said gas heated reformer.

24. The process according to claim 16, wherein said gas heated reformer comprises a tube and shell reactor, said tubes containing a reforming catalyst through which said hydrogen production unit feed stream is passed, and wherein said high-pressure combustion gas stream from said pressurized partial combustion unit is delivered to the shell-side of said reactor.

25. The process according to claim 16, wherein said gas heated reformer produces a reformer product stream comprising a quantity of hydrogen and carbon monoxide, said reformer product stream being fed to said water gas shift reactor for the production of carbon dioxide and additional quantities of hydrogen.

26. The process according to claim 25, wherein said shift reactor produces a shift reactor product stream which is fed to said hydrogen separator thereby producing said hydrogen-containing stream and said low-BTU hydrocarbon fuel stream.

27. The process according to claim 26, wherein said hydrogen separator comprises a pressure swing adsorber.

28. A system for the co-production of hydrogen and power comprising:
a hydrogen production unit including:
a gas heated reformer including a reforming catalyst through which a stream comprising a first portion of a high-BTU hydrocarbon fuel and steam is passed;
a pressurized partial combustion unit that supplies a high-pressure combustion gas stream to said gas heated reformer, a water gas shift reactor
a hydrogen separator that produces a low-BTU hydrocarbon fuel stream and a hydrogen containing stream; and
a power generation unit including:
a combustion gas turbine engine that combusts an oxygen containing gas and a second portion of the high-BTU hydrocarbon fuel for generating power;
a compressed oxygen-containing gas stream that is extracted from said combustion gas turbine engine;
a compressor for further compressing said compressed oxygen-containing gas extracted from said combustion gas turbine engine; and
said low-BTU hydrocarbon fuel stream and said compressed oxygen-containing gas stream being fluidly coupled with said pressurized partial combustion unit.

29. The system according to claim 28, wherein said high-BTU hydrocarbon fuel is selected from the group consisting of natural gas, propane, LPG, butane, pentane, diesel oil, and combinations thereof.

30. The system according to claim 28, wherein said gas heated reformer comprises a tube and shell reactor, said tubes containing said reforming catalyst and said high-pressure combustion gas stream being delivered to the shell-side of said reactor.

31. The system according to claim 30, wherein said high-pressure combustion gas stream exits said gas heated reformer as a cooled combustion gas stream, said cooled combustion gas stream being fluidly coupled with said combustion gas turbine engine.

32. The system according to claim 28, wherein said power generation unit comprises a combined cycle process including said combustion gas turbine engine and a heat recovery steam generator.

33. The system according to claim 32, wherein an exhaust gas stream exits said combustion gas turbine engine, said exhaust gas stream being fluidly coupled with and supplying heat to said steam generator for the production of steam.

34. The system according to claim 28, wherein said power generation unit further comprises at least one heat exchanger for cooling said compressed oxygen-containing gas extracted from said combustion gas turbine engine, said heat exchanger being located upstream from said compressor.

* * * * *